Patented Oct. 21, 1952

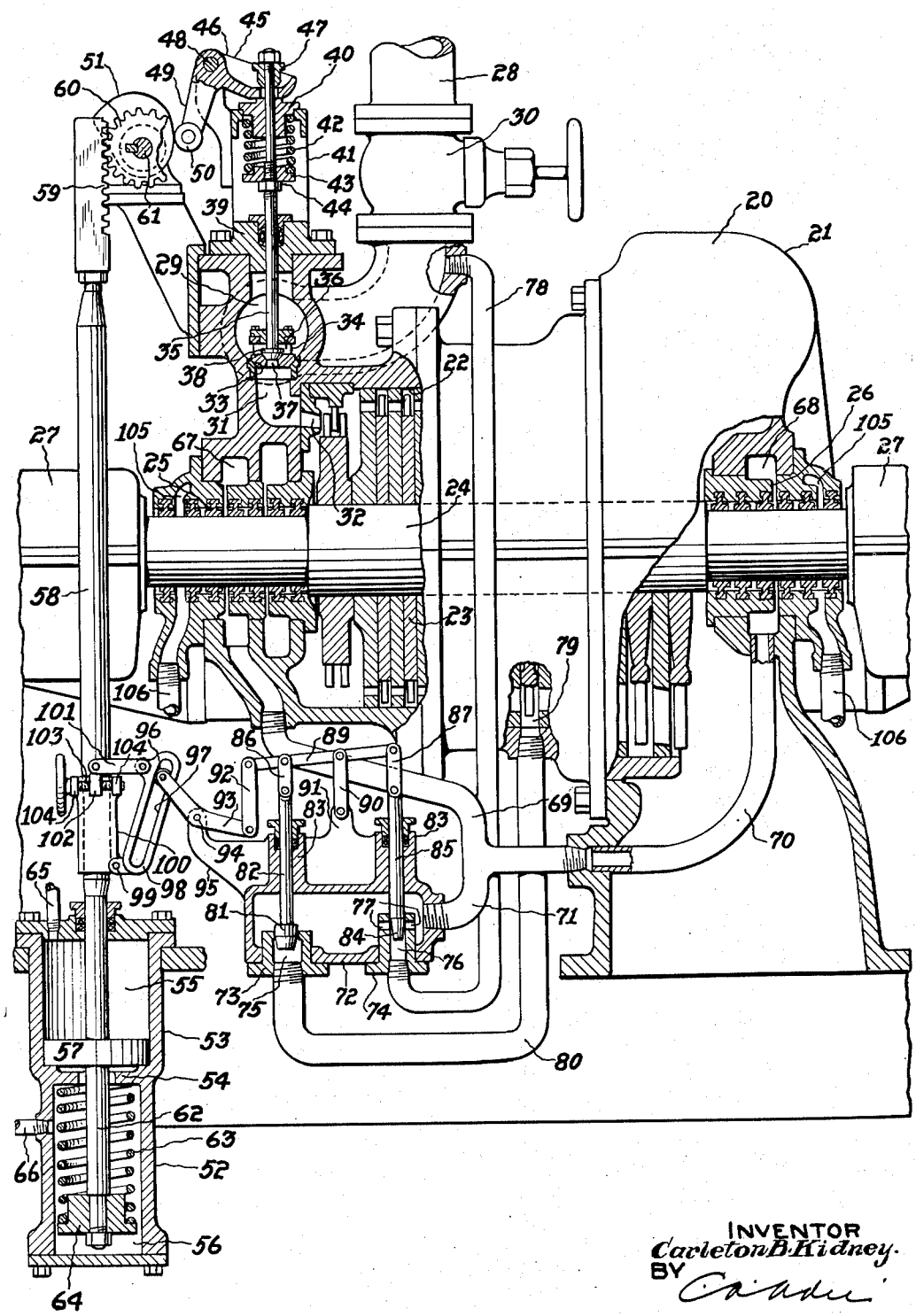

2,614,797

UNITED STATES PATENT OFFICE 2,614,797

PRESSURE FLUID SEAL CONTROLLING DEVICE

Carleton B. Kidney, Easton, Pa., assignor to Ingersoll-Rand Company, New York, N. Y., a corporation of New Jersey Application March 10, 1947, Serial No. 733,547

4 Claims. (Cl. 253—39)

This invention relates to sealing devices, and more particularly to a pressure fluid seal controlling device for the high and low pressure ends of prime movers, as for example steam turbines.

One object of the invention is to prevent the leakage of atmospheric air through the packing box at the low pressure end of the turbine.

Another object is to prevent the leakage of steam from the packing boxes to the exterior of the turbine.

Further objects will be in part obvious and in part pointed out hereinafter.

The drawing accompanying this specification is a vertical side view, partly broken away, of a steam turbine equipped with a pressure fluid seal controlling device constructed in accordance with the practice of the invention.

Referring more particularly to the drawing, 20 designates a turbine and 21 its casing having a wheel chamber 22 and a multi-stage wheel 23 therein. The wheel 23 is mounted upon a shaft 24 extending through packing boxes 25 and 26 at the low and high pressure ends of the casing 21, respectively, and is supported by out-board bearings 27.

The steam supply is conveyed to the turbine by a conduit 28 leading to a chamber 29 in the casing 21 and is controlled by a manually operable valve 30 in the conduit. The steam passes from the chamber 29 to the wheel chamber 22 through a passage 31 and a nozzle 32, and at the juncture of the passage 31 with the chamber 29 is a seat 33 for a throttle valve 34 which controls communication between the chamber 29 and the wheel chamber 22.

The throttle valve 34 is mounted on a rod 35 upon which it has a limited degree of movement axially, and has a passage 36 extending transversely therethrough to communicate at its ends with the chamber 29 and at its intermediate portion with a port 37 in the throttle valve and positioned for constant communication with the passage 31. On the lower end of the rod 35 is a valve head 38 for controlling communication between the passage 36 and the port 37 and also to engage the roof of the passage 36 for lifting the valve 34 off of the seating surface 33.

The rod is slidable in a cover 39 for the chamber 29 and in a bushing 40 lying in an end wall of a bracket 41 on top of the cover 39. The bushing 40 also serves as a seat for an end of a spring 42 the other end of which engages a plate 43 resting upon a nut 44 on the rod 35. The spring 42 constantly tends to depress the rod 35 for maintaining the valves 34—38 in closed position and its force may be varied by adjusting the nut 44 on the rod 35.

The portion of the rod 35 lying above the bracket 41 extends through an arm 45 of a bell crank 46 and carries an adjustable abutment 47 for the arm 45. In the angle of the bell crank 46 is a pivot pin 48 which is supported by the bracket 41, and on the free end of the other arm 49 of the bell crank is a roller 50 for engagement with a cam 51 serving to tilt the bell crank 46 for lifting the valves 34 and 38 off of their seats.

In the arrangement shown, the cam 51 is actuated by a power device 52 comprising a casing 53 having an internal flange 54 that divides its interior into chambers 55 and 56. Within the chamber 55 is a piston 57 having a rod 58 on the free end portion of which is a rack 59 that meshes with a pinion 60 on the shaft 61 carrying the cam 51. The stroke of the piston 57 is limited by the end surfaces of the chamber 55, and on the lower end of the piston is a stem 62 that extends loosely through the flange 54 and is encircled by a spring 63 interposed between the flange 54 and a spring seat 64 on the rod and acting to move the piston 57 to its lowermost limiting position to hold the cam 51 inactive.

The force of the spring 63 is augmented by pressure fluid admitted into the upper portion of the chamber 55 through a conduit 65, and movement of the piston 57 in the opposite direction, for imparting opening movement to the valves 34 and 38, is effected by pressure fluid which is conveyed into the chamber 56 by a conduit 66 and flows through the flange 54 to act against the underside of the piston 57. The control of the pressure fluid actuating the power device may be effected in any suitable and well known manner, as for example by devices (not shown) operating in response to variations in the load on the turbine.

As is well known, it is difficult to entirely prevent the leakage of fluid medium through the packing boxes 25 and 26. Thus, during the operation of the turbine at light loads atmospheric air leaks through the packing boxes into the wheel chamber, and at heavy loads, and correspondingly high pressures, steam leaks from the wheel chamber to the atmosphere. These conditions are, of course, objectionable and the turbine is accordingly equipped with means actuated by the power device 52 for preventing their occurrence. In furtherance of this end, the packing boxes 25 and 26 are respectively provided with compartments 67 and 68 and leading therefrom are branches 69 and 70 of a pipe 71 which opens into a manifold 72 adjacent the rod 58 of the power device 52.

Extending into the manifold 72 are two members 73 and 74 having passages 75 and 76, respectively. The passage 75 opens at its inner end into the manifold, and the member 74 is provided near the same end with radial ports 77 to afford communication between the passage 76 and the manifold and is in constant communication with the supply conduit 28 at a point between the valve 30 and the chamber 29 through a pipe 78, and the passage 75 is in constant communication with an intermediate stage 79 of the turbine 20 through a pipe 80.

The upper end of the passage 75 is controlled by a reciprocatory valve 81, movable into and out of the end of the said passage to perform its controlling function, and on said valve is a rod 82 that extends slidably through a stuffing box 83 on the manifold 72. Communication between the passage 76 and the ports 77 is likewise controlled by a reciprocatory valve 84 which is in telescopic engagement with the upper end of the passage 76 and has a rod portion 85 extending through the stuffing box 83 on the manifold.

The lower ends of the valves 81 and 84 are suitably tapered to vary the flow of steam into and out of the manifold and the free ends of the rods 82 and 85 are pivotally connected to links 86 and 87, respectively, that are connected in like manner at their opposite ends to a beam 89. The beam 89 is pivotally connected intermediate the links 86 and 87 to a bar 90 which lies in parallelism with the links 86—87 and is pivotally connected at its lower end to a rib 91 on the manifold 72.

The beam 89 extends beyond the point at which it is connected to the link 86 and the end thus projecting is connected pivotally to a link 92 that lies in parallelism with the link 86 and is pivotally connected at its other end to an end of a bell crank 93. A pivot pin 94 seated in a bracket 95 on the manifold 72 extends through the angle of the bell crank 93, and on the other end of the bell crank is a roller 96 that lies in a slot 97 of a cam member 98 carried by the rod 58. The lower end of the cam member 98 is pivotally connected, by a pin 99, to a sleeve 100 on the rod and secured thereto in any suitable manner.

The cam member is held in a desired angular relationship with the rod 58 by a link 101 which has one end pivotally connected to the cam member and the other end to a nut 102 on an adjusting screw 103 journaled in bearings 104 on the sleeve 100. The bearings 104 are spaced a suitable distance apart so that the nut 102 is capable of traveling along the length of the screw 103 for changing the inclination of the cam member 98.

Preferably, each packing box is provided near its uppermost end with a compartment 105 for the interception of such steam as may flow outwardly along the shaft from the compartments 67 and 68, and each compartment 105 is provided with a drain conduit 106 for conveying such steam to a suitable point in the power system of the turbine.

In practice and at the beginning of an operating period of the turbine, at which time the piston 57 will be seated upon the flange 54 and the valves 34 and 38 will rest upon their seating surfaces, the cam member 98 and the linkage associated therewith will hold the valve 81 in the closed position and the valve 84 in position to uncover the ports 77. Steam will then flow through the pipe 78, member 74, manifold 72 and the pipe 71 and its branches into the compartments 67—68 of the packing boxes and preclude the leakage of atmospheric air therethrough into the wheel chamber. Motive fluid thereafter introduced into the chamber 56 and acting against the lower surface of the piston 57 will elevate the rack 59 and rotate the cam 51. The initial movement of the cam 51 will cause the bell crank to elevate the valve 38 and steam will then flow from the chamber 29 through the port 37 and associated passages into the wheel chamber 22 for starting the wheel 23.

Thereafter, if load conditions require an increased supply of steam to the wheel chamber the piston 57 will rise to a higher elevation and cause the valve 34 to be opened in the required degree, and when the pressure within the wheel chamber reaches a sufficiently high value steam will leak from the wheel chamber along the shaft 24 into the compartments 67—68 and obviate the further need of valving steam thereto directly from supply. In the position which the rod 58 must assume to bring about the foregoing condition the cam member 98 will also lie in position to tilt the beam 89 in such wise that the valve 84 will overlie the ports 77 and the valve 81 will uncover the passage 75. Communication between steam supply and the manifold 72 will then be cut-off and the steam leaking from the wheel chamber into the compartments 67—68 will flow through the pipe 71, manifold 72, passage 75 and the pipe 80 into the wheel chamber 22.

The valves 81 and 84 will remain in the positions described as long as the pressure in the wheel chamber is of a value to cause leakage of steam therefrom into the compartments 67—68. When, however, the load on the turbine is reduced in sufficient degree and the steam supply to the wheel chamber is decreased accordingly by descending movement of the piston 57, the valves 81 and 84 will, respectively, be caused to move toward their closed and open positions to again cut-off communication between the pipe 80 and the manifold and to reestablish communication between steam supply and the compartments 67—68.

Whenever the clearances initially provided between the opposed surfaces of the packing boxes and the shaft become enlarged through wear, and in consequence of which leakage through the packing boxes will take place at an increased rate, the screw 103 is manipulated to increase the angle between the rod 58 and the cam member 98. The cam member will then cause the valves 81 and 84 to assume positions for promptly directing a full supply of sealing steam to the packing boxes at the instant of starting of the turbine and the chances of drawing atmospheric air into the turbine will thereby be obviated.

I claim:

1. In a pressure fluid seal controlling device, a casing having a wheel chamber, a wheel therein having a shaft, a packing box for the shaft, means for controlling the supply of pressure fluid to the wheel chamber, a valve for controlling the flow of pressure fluid to the packing box to prevent the leakage of atmospheric air through the packing box into the wheel chamber, a second valve to control the flow of pressure fluid from the packing box, linkage connected to the valves to simultaneously impart closing movement to one valve and opening movement to the other valve, and a cam carried by the said means for transmitting movement from the said means to the linkage and the valves.

2. In a pressure fluid seal controlling device, a casing having a wheel chamber, a wheel therein having a shaft, a packing box for the shaft, means for controlling the supply of pressure fluid to the wheel chamber, a valve for controlling the flow of pressure fluid to the packing box to prevent the leakage of atmospheric air through the packing box into the wheel chamber, a second valve to control the flow of pressure fluid from the packing box, linkage connected to the valves to simultaneously impart closing movement to one valve and opening movement to the other valve, a cam carried by the said means for transmitting movement from the said means to the linkage and the valves, and means for effecting adjustment of the cam relatively to said means for varying the rate of speed of the opening and closing movements of the valves with respect to the rate of movement of the said means.

3. In a pressure fluid seal controlling device, a casing having a wheel chamber, a wheel therein having a shaft, a packing box for the shaft, means for controlling the supply of pressure fluid to the wheel chamber, a valve for controlling the flow of pressure fluid to the packing box to prevent the leakage of atmospheric air through the packing box into the wheel chamber, a second valve to control the flow of pressure fluid from the packing box, linkage connected to the valves to simultaneously impart closing movement to one valve and opening movement to the other valve, a cam carried by the said means for transmitting movement from the said means to the linkage and the valves, and means for varying the angular position of the cam with respect to the first mentioned means to vary the rate of speed of the opening and closing movements of the valves with respect to the rate of movement of the first mentioned means.

4. In a pressure fluid seal controlling device, a casing having a wheel chamber, a wheel therein having a shaft, a packing box for the shaft, means for controlling the flow of pressure fluid to the wheel chamber, a reciprocatory rod for imparting movement to said means, a valve for valving pressure fluid to the packing box to prevent the leakage of atmospheric air through the packing box into the wheel chamber, a second valve to control the flow of pressure fluid from the packing box, linkage connected to the valves to simultaneously impart closing movement to one valve and opening movement to the other valve, a cam carried by the rod for transmitting movement of the rod to the linkage and the valves, a pivot for connecting the same to the rod, and means for turning the cam on the pivot to change the angular position of the cam with respect to the rod for varying the rate of speed of the opening and closing movements of the valves with respect to the rate of movement of the rod.

CARLETON B. KIDNEY.

REFERENCES CITED

The following references are of record in the file of this patent:

UNITED STATES PATENTS

| Number | Name | Date |
|---|---|---|
| 1,002,813 | Rotter | Sept. 5, 1911 |
| 1,022,788 | Kieser | Apr. 9, 1912 |
| 1,352,743 | Hall | Sept. 14, 1920 |
| 1,467,575 | Flanders | Sept. 11, 1923 |

FOREIGN PATENTS

| Number | Country | Date |
|---|---|---|
| 286,623 | Great Britain | Jan. 3, 1929 |